United States Patent [19]
Wills

[11] 3,793,936
[45] Feb. 26, 1974

[54] CAMPING TOASTER
[75] Inventor: John Alexander Wills, Vernon, B. C., Canada
[73] Assignee: The Raymond Lee Organization, Inc., New York, N.Y.
[22] Filed: May 15, 1972
[21] Appl. No.: 244,967

[52] U.S. Cl. .................. 99/339, 99/385, 99/447, 99/450
[51] Int. Cl. ............................................ A47j 37/08
[58] Field of Search ..... 99/339, 447, 449, 450, 385, 99/401, 448; 126/9, 25

[56] References Cited
UNITED STATES PATENTS

| | | | |
|---|---|---|---|
| 1,468,069 | 9/1923 | Herbert | 99/447 |
| 1,698,933 | 1/1929 | Chartier | 99/447 |
| 2,413,204 | 12/1946 | Wolff | 99/447 |
| 2,417,266 | 3/1947 | Petrakakis | 99/447 |
| 2,521,855 | 9/1950 | Kodadek et al. | 99/339 |
| 2,597,477 | 5/1952 | Haislip | 126/25 R |
| 3,416,510 | 12/1968 | Paulson | 126/25 R |
| 3,478,733 | 11/1969 | Meyerhoefer | 126/25 R X |

Primary Examiner—Harvey C. Hornsby
Assistant Examiner—Arthur O. Henderson
Attorney, Agent, or Firm—Howard I. Podell

[57] ABSTRACT

A device for cooking toast over a gas burner or flame consisting of a rectangular pan with holes in the bottom, and a wire screen member for holding the bread, said wire screen resting on the top of the sides of pan, in the area directly above the pan holes.

1 Claim, 2 Drawing Figures

PATENTED FEB 26 1974

3,793,936

CAMPING TOASTER

SUMMARY OF THE INVENTION:

My invention relates to a simple portable device for toasting bread over a campfire, a gas range or other source of heat.

In my invention, a rectangular metal pan is formed with holes along the bottom to permit heat to enter the pan from a fire below, while maintaining the maximum temperature within the necessary limits to toast a slice of bread, said slice of bread being mounted on a screen of expanded metal attached to the top of the sides of the pan.

BRIEF DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
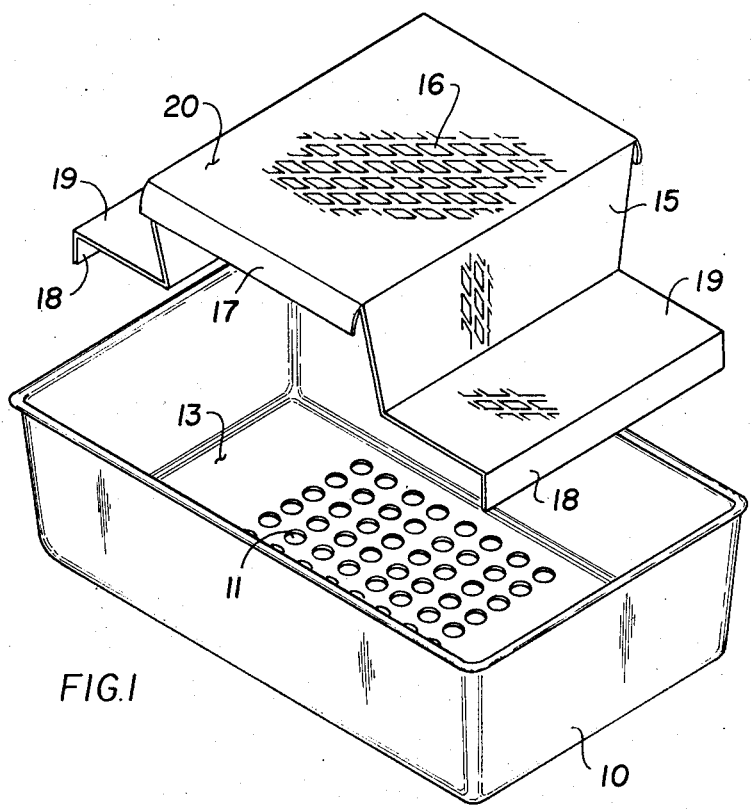
FIG. 1 is an exploded view of the pan and the toasting screen.
Figure 2:
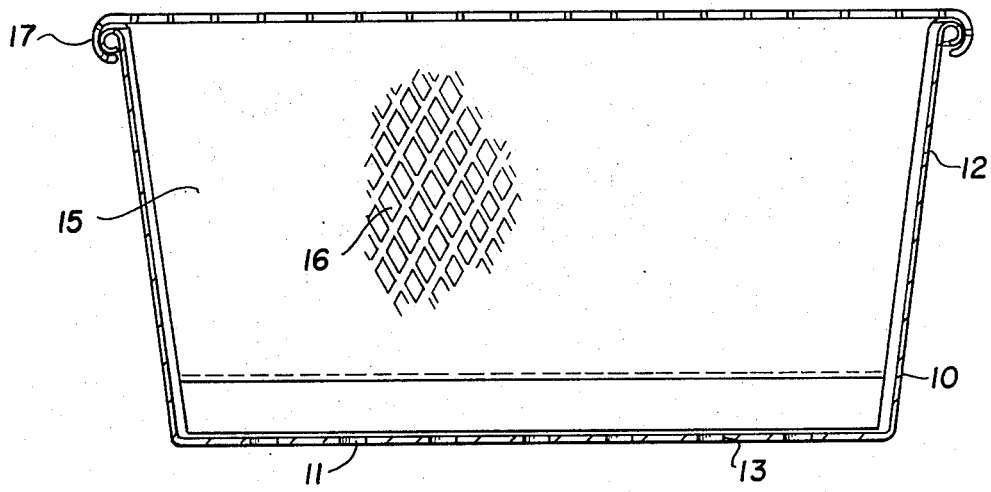
FIG. 2 is an end view in cross-section of the pan with screen in place.

Turning now descriptively to the drawing in which similar reference characters denote similar elements throughout the several views, FIG. 1 and FIG. 2 illustrate the toaster which consists of two pieces, a pan 10 with holes 11 in the bottom 13, and a screen 15 of expanded metal with holes 16 throughout the surface. The slide lips 17 of the screen 15 rest on the sides 12 folding about said sides of the toaster pan 10, as well as on folded legs 18 which fit into the pan 10 and rest on the pan bottom 13.

The rate of toasting of a slice of bread, which is laid on the top 20 of the screen 15, is dependent upon the size of holes 11 in the bottom 13 of the pan 10.

The bottom 13 is perforated with holes 11 directly under the upraised top 20 of screen 15, leaving the sides of the bottom 13 unperforated directly under the end sections 19 of screen 15. End section 19 may be used as a warming area for finished toast and other foods, being shielded from the direct heat of the flame by the unperforated section of bottom 13.

The dimensions of a preferred embodiment of the pan 10 is 9-¾ inches long by 5-¾ inches wide by 2-¾ inches deep, and the bottom legs 18 keep the base of the screen 15 from three-eighth inch to one-half inch off the bottom 13 of the pan 10.

Since obvious changes may be made in the specific embodment of the invention described herein without departing from the scope thereof, it is indicated that all matter contained herein is intended to be interpreted in an illustrative and not a limiting sense.

Having thus described my invention, what I claim as new, and desire to secure by Letters Patent of the United States is:

1. A portable device for the toasting of bread over a campfire or a gas range or other external source of heat consisting of a rectangular open top metal pan with a series of holes in the middle section of the bottom of said pan to regulate the amount of heat which enters the pan from the external heat source and a screen of expanded metal having two opposite end sections and a middle section, the middle section resting on top of the open sides of said rectangular metal pan, so that a layer of bread laid upon the top of the middle section of said screen will be uniformly toasted on its underside, with the said end sections of the screen of expanded metal being stepped and the plane of each end section being parallel to the plane of the middle section of the screen, each end section being of such a size such that they lie below the top of the metal pan and closely adjacent said bottom of said pan, when the middle section of the screen rests on top of the pan sides, said end sections being used for the purpose of retaining toasted bread in a warm condition, outside of said openings in said bottom of said pan, with the length and width of the middle section and each end section of the screen being of the general dimensions of a slice of bread, and with the holes in the middle section of the bottom of the pan lying directly below the middle section of the screen, in the assembled mode, when the pan is mounted over a source of heat.

* * * * *